US011433960B2

(12) United States Patent
Zuleger et al.

(10) Patent No.: US 11,433,960 B2
(45) Date of Patent: Sep. 6, 2022

(54) LOAD SPAN TAG AXLE SYSTEM

(71) Applicant: Oshkosh Corporation, Oshkosh, WI (US)

(72) Inventors: Jason Zuleger, Oshkosh, WI (US); Ryan Wolf, Oshkosh, WI (US); Jeremy Andringa, Oshkosh, WI (US); Mitchell Murphy, Oshkosh, WI (US); Brian Van Caster, Milwaukee, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

(21) Appl. No.: 17/180,413

(22) Filed: Feb. 19, 2021

(65) Prior Publication Data

US 2021/0171137 A1    Jun. 10, 2021

Related U.S. Application Data

(63) Continuation of application No. 16/295,512, filed on Mar. 7, 2019, now Pat. No. 10,953,939.

(60) Provisional application No. 62/682,529, filed on Jun. 8, 2018, provisional application No. 62/640,393, filed on Mar. 8, 2018.

(51) Int. Cl.
| | |
|---|---|
| *B62D 61/12* | (2006.01) |
| *B60B 35/02* | (2006.01) |
| *B60G 17/04* | (2006.01) |
| *B60G 17/08* | (2006.01) |
| *B62D 7/20* | (2006.01) |
| *B60G 5/04* | (2006.01) |
| *B62D 7/06* | (2006.01) |

(52) U.S. Cl.
CPC .............. *B62D 61/12* (2013.01); *B60B 35/02* (2013.01); *B60G 5/04* (2013.01); *B60G 17/04* (2013.01); *B60G 17/08* (2013.01); *B62D 7/06* (2013.01); *B62D 7/20* (2013.01); *B60G 2200/314* (2013.01); *B60G 2202/15* (2013.01); *B60G 2202/24* (2013.01); *B60G 2300/09* (2013.01)

(58) Field of Classification Search
CPC .. B62D 61/12; B62D 7/20; B62D 7/06; B60B 35/02; B60B 35/04; B60B 35/007; B60B 2360/102; B60B 2310/211; B60B 2360/141; B60G 17/04; B60G 17/08; B60G 5/04; B60G 2300/09; B60G 2200/314; B60G 2202/15; B60G 2202/24; B60G 2300/402; B60G 2204/47; B60G 9/022
See application file for complete search history.

(56) References Cited

U.S. PATENT DOCUMENTS

| | | |
|---|---|---|
| 3,912,293 A | 10/1975 | Harbers |
| 4,773,670 A | 9/1988 | Raidel, II |
| 5,230,528 A | 7/1993 | Van Raden et al. |
| 5,540,454 A | 7/1996 | Vandenberg et al. |
| 5,549,322 A | 8/1996 | Hauri |
| 5,810,377 A | 9/1998 | Keeler et al. |
| 6,007,078 A | 12/1999 | Gottschalk et al. |
| 6,189,901 B1 | 2/2001 | Smith et al. |

(Continued)

*Primary Examiner* — Drew J Brown
(74) *Attorney, Agent, or Firm* — Foley & Lardner LLP

(57) ABSTRACT

Systems and apparatuses include a tag axle system including an axle assembly, a linkage coupling the axle assembly to a vehicle chassis, and a hydraulic cylinder coupled between the vehicle chassis and the axle assembly. The hydraulic cylinder actuates the axle assembly between a raised position and a lowered position, and acts as a spring damper suspension component.

16 Claims, 13 Drawing Sheets

(56) References Cited

U.S. PATENT DOCUMENTS

| | | |
|---|---|---|
| 6,398,236 B1 | 6/2002 | Richardson |
| 6,416,136 B1 | 7/2002 | Smith |
| 6,516,914 B1 | 2/2003 | Andersen et al. |
| 6,561,718 B1 | 5/2003 | Archer et al. |
| 6,764,085 B1 | 7/2004 | Anderson |
| 6,779,806 B1 | 8/2004 | Breitbach et al. |
| 7,748,724 B2 | 7/2010 | Gottschalk |
| 8,523,202 B1 | 9/2013 | Strong et al. |
| 8,955,859 B1 | 2/2015 | Richmond et al. |
| 9,045,014 B1 | 6/2015 | Verhoff et al. |
| 9,329,000 B1 | 5/2016 | Richmond et al. |
| 9,656,640 B1 | 5/2017 | Verhoff et al. |
| 9,724,965 B2 | 8/2017 | Gottschalk |
| 2003/0094846 A1 | 5/2003 | Dodd |
| 2003/0230863 A1 | 12/2003 | Archer |
| 2004/0017859 A1 | 1/2004 | Sills et al. |
| 2005/0001400 A1 | 1/2005 | Archer et al. |
| 2006/0021541 A1 | 2/2006 | Siebers et al. |
| 2006/0192361 A1 | 8/2006 | Anderson et al. |
| 2007/0126198 A1 | 6/2007 | Kirkham |
| 2009/0033044 A1 | 2/2009 | Linsmeier |
| 2009/0179396 A1 | 7/2009 | Gottschalk |
| 2011/0114409 A1 | 5/2011 | Venton-Walters |
| 2012/0049470 A1 | 3/2012 | Rositch et al. |
| 2012/0056469 A1 | 3/2012 | Bubulka et al. |
| 2012/0098215 A1 | 4/2012 | Rositch et al. |
| 2013/0249175 A1 | 9/2013 | Ellifson |
| 2013/0249183 A1 | 9/2013 | Ellifson et al. |
| 2013/0264784 A1 | 10/2013 | Venton-Walters et al. |
| 2013/0300073 A1 | 11/2013 | Venton-Walters et al. |
| 2014/0131969 A1 | 5/2014 | Rowe et al. |
| 2014/0210173 A1 | 7/2014 | Conaway et al. |
| 2014/0255136 A1 | 9/2014 | Malcolm et al. |
| 2014/0265203 A1 | 9/2014 | Zuleger et al. |
| 2014/0291945 A1 | 10/2014 | Venton-Walters et al. |
| 2014/0326555 A1 | 11/2014 | Ellifson et al. |
| 2014/0334956 A1 | 11/2014 | Venton-Walters et al. |
| 2015/0028529 A1 | 1/2015 | Ellifson |
| 2015/0151651 A1 | 6/2015 | Stingle et al. |
| 2015/0191069 A1 | 7/2015 | Zuleger et al. |
| 2015/0197129 A1 | 7/2015 | Venton-Walters et al. |
| 2015/0224847 A1 | 8/2015 | Rowe et al. |
| 2016/0009231 A1 | 1/2016 | Perron et al. |
| 2016/0167475 A1 | 6/2016 | Ellifson et al. |
| 2016/0304051 A1 | 10/2016 | Archer et al. |
| 2016/0368432 A1 | 12/2016 | Perron et al. |
| 2017/0137076 A1 | 5/2017 | Perron et al. |
| 2017/0253221 A1 | 9/2017 | Verhoff et al. |
| 2017/0267052 A1 | 9/2017 | Zuleger et al. |
| 2017/0282670 A1 | 10/2017 | Venton-Walters et al. |
| 2017/0291802 A1 | 10/2017 | Hao et al. |
| 2017/0291805 A1 | 10/2017 | Hao et al. |
| 2017/0297425 A1 | 10/2017 | Wildgrube et al. |
| 2018/0056746 A1 | 3/2018 | Ellifson et al. |
| 2018/0162704 A1 | 6/2018 | Hao et al. |
| 2018/0257449 A1 | 9/2018 | Delorenzis et al. |
| 2018/0272818 A1 | 9/2018 | Johnson |
| 2019/0092407 A1 | 3/2019 | Jacobsma et al. |
| 2019/0106083 A1 | 4/2019 | Archer et al. |
| 2019/0118875 A1 | 4/2019 | Perron et al. |
| 2019/0185077 A1 | 6/2019 | Smith et al. |
| 2019/0185301 A1 | 6/2019 | Hao et al. |

LOAD SPAN TAG AXLE SYSTEM

CROSS-REFERENCE TO RELATED PATENT APPLICATIONS

This application is a continuation of U.S. patent application Ser. No. 16/295,512, filed on Mar. 7, 2019, and claims the benefit of U.S. Provisional Patent Application No. 62/640,393, filed on Mar. 8, 2018, and U.S. Provisional Patent Application No. 62/682,529, filed on Jun. 8, 2018 all of which are incorporated by reference in their entireties.

BACKGROUND

Work vehicles are known to carry heavy loads, and often to carry these loads over unpaved surfaces such as dirt roads and around construction sites. In particular, concrete trucks carry large drums full of concrete long distances and often must traverse unpaved surfaces to access the site for unloading the concrete from the drum. Concrete trucks typically include a cab for the operator and a rotatable drum behind the cab for containing and mixing concrete. Such concrete trucks further typically include a set of front wheels for steering, and plural rear drive axles carrying dual wheel or wide single line arrangements mounted on a continuous elongate chassis for load-support. For additional load-support, particularly in-transit when the drum is substantially full, a concrete truck can benefit by having a pivotally mounted tag axle (auxiliary axle) system able to operate between a raised position, in which it is carried by the truck, and a lowered/deployed position in which the tag axle and its wheels share the truck's load. Not only does the tag axle system assist in balancing the load carried by the concrete truck when the drum is fully loaded, it may facilitate the concrete truck carrying a higher total payload than would otherwise be permitted, because weight restrictions placed on vehicles traveling over highways are typically measured in terms of load per axle in combination with overall spacing between axles of a vehicle. By deploying a tag axle system, the number of axles as well as the spacing thereof can be increased when the truck is heavily loaded, thereby enabling the truck to transport a higher total legal payload.

SUMMARY

One exemplary embodiment relates to a tag axle system that includes an axle assembly, a linkage coupling the axle assembly to a vehicle chassis, and a hydraulic cylinder coupled between the vehicle chassis and the axle assembly. The hydraulic cylinder actuates the axle assembly between a raised position and a lowered position, and acts as a spring damper suspension component.

Another exemplary embodiment relates to a tag axle system that includes an axle assembly including an axle beam that includes a plurality of plates welded together, each plate defining no more than two bends, and a plurality of axle brackets fastened to the axle beam. The tag acle system also includes a hydraulic cylinder coupled between a vehicle chassis and the axle assembly. The hydraulic cylinder actuating the axle assembly between a raised position and a lowered position, and acting as a spring damper suspension component.

Another exemplary embodiment relates to tag axle system that includes an axle beam including a plurality of plates welded together, each plate defining no more than two bends, a hydraulic cylinder coupled between a vehicle chassis and the axle beam, and a kingpin. The hydraulic cylinder actuates the axle beam between a raised position and a lowered position, and acts as a spring damper suspension component. The kingpin is coupled to the axle beam and arranged at a kingpin caster angle that is maintained in all loading conditions when the axle assembly is in the lowered position.

The invention is capable of other embodiments and of being carried out in various ways. Alternative exemplary embodiments relate to other features and combinations of features as may be recited herein.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring to the figures generally, the various exemplary embodiments disclosed herein relate to systems, apparatuses, and methods for a tag axle of a vehicle including a four-bar swing linkage mounted between an axle assembly and a vehicle chassis that provides a controlled motion of the tag axle between a raised position and a lowered position. The axle assembly includes an axle beam developed for ease-of-manufacturing. Two dual action hydraulic cylinders (i.e., dual acting hydraulic cylinders) are coupled between the axle assembly and the vehicle chassis and serve two primary purposes. First, the dual action cylinders drive the actuation of the four-bar swing linkage between the raised position and the lowered position. Second, the dual action cylinders are part of the primary suspension for the tag axle. Each dual action cylinder is in communication with or includes an accumulator with a gas chamber providing a spring and/or damper action. Additionally, the tag axle includes a connecting rod that links a steering knuckle of each of two wheel assemblies. The wheel assemblies also include steering centering springs that act to bias the tag axle toward a centered steering position. The four-bar swing linkage is arranged around the connecting rod and sized so that a kingpin caster angle of each of the wheel assemblies remains constant or nearly constant as the tag axle moves between the raised position and the lowered position.

Figure 1:
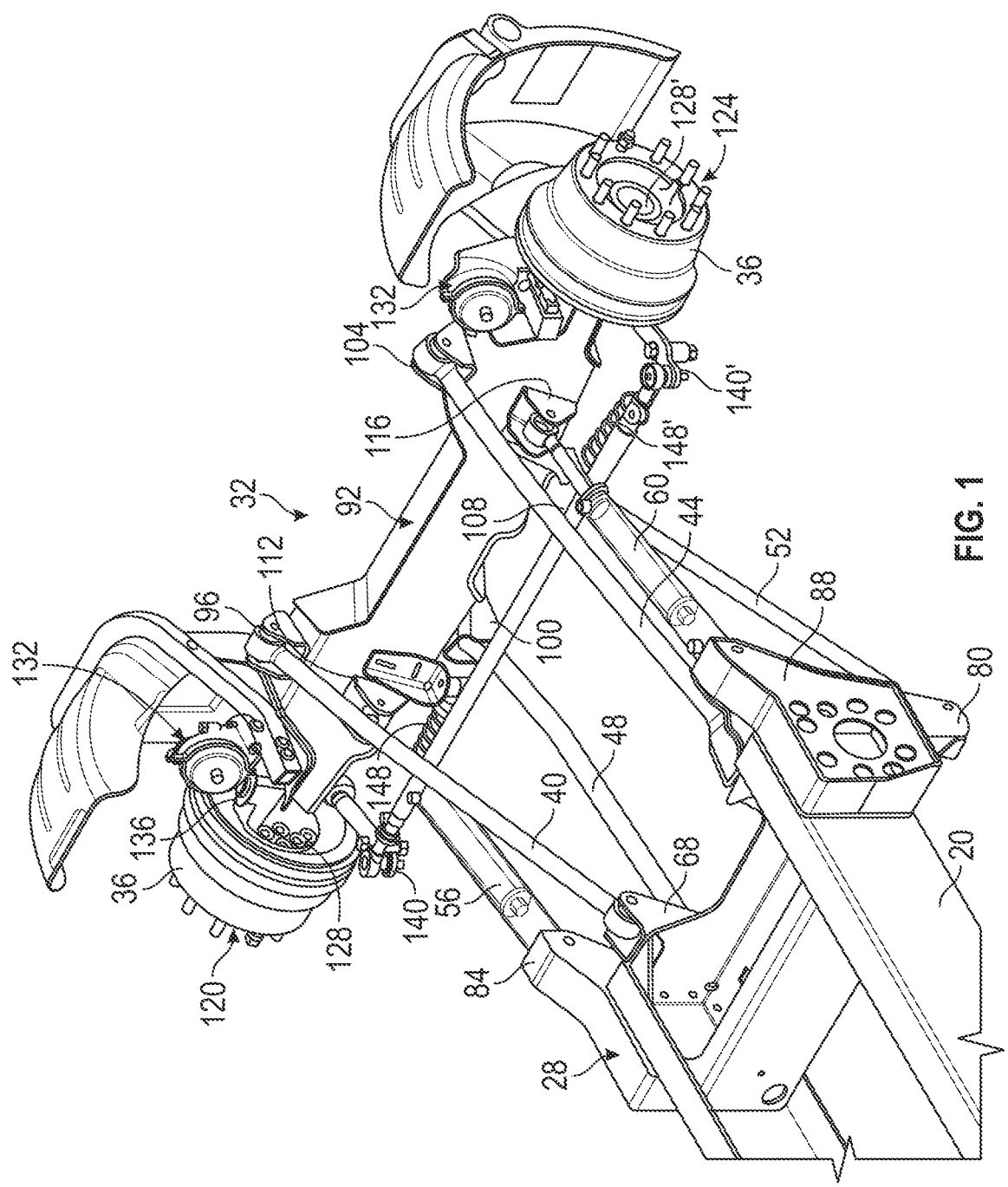
FIG. 1 is a top, front, left perspective view of a load span tag axle (LSTA) system in a raised position, with the wheels removed, according to an exemplary embodiment.
Figure 2:
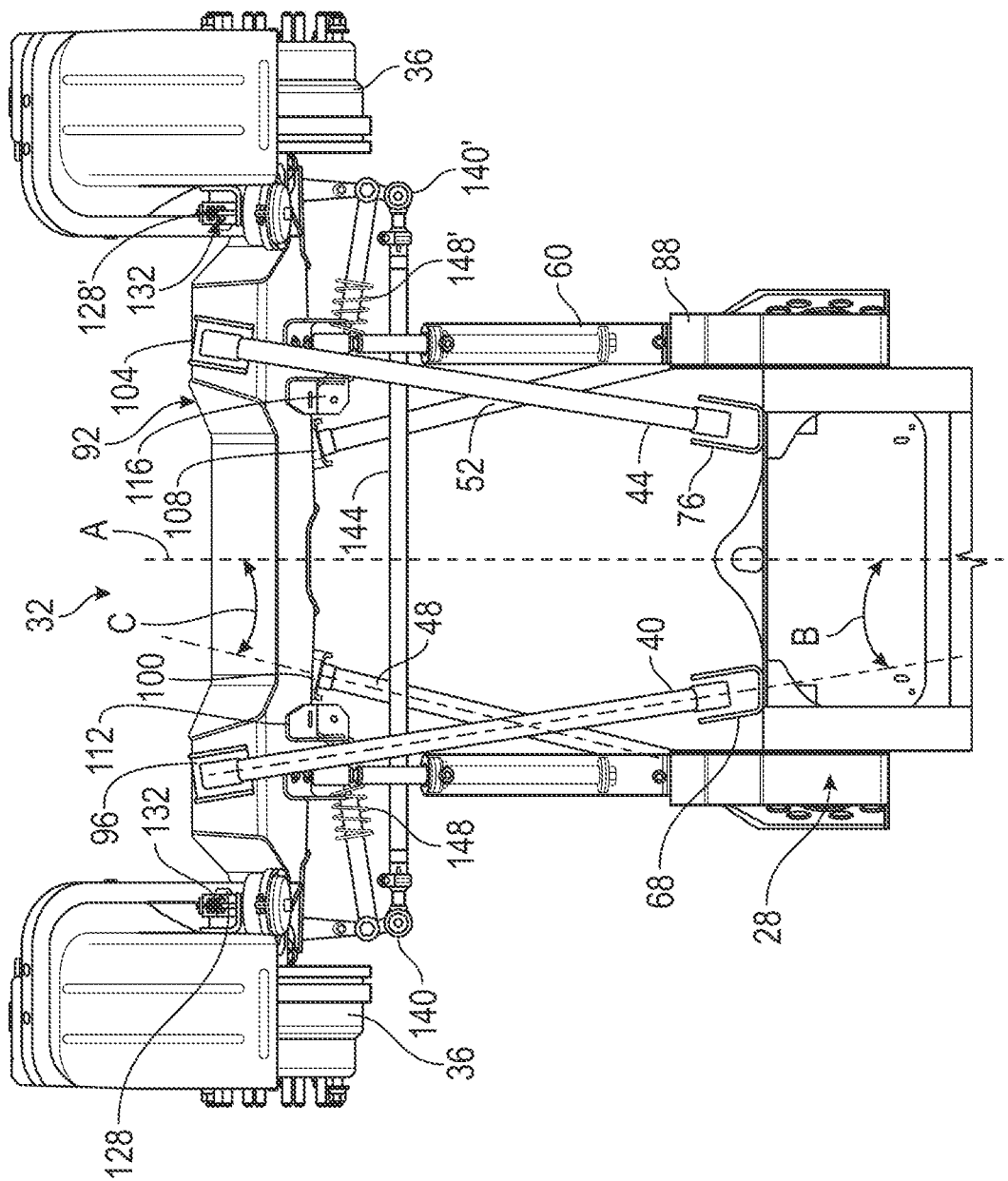
FIG. 2 is a top view of the LSTA system of FIG. 1 in the raised position.
Figure 3:
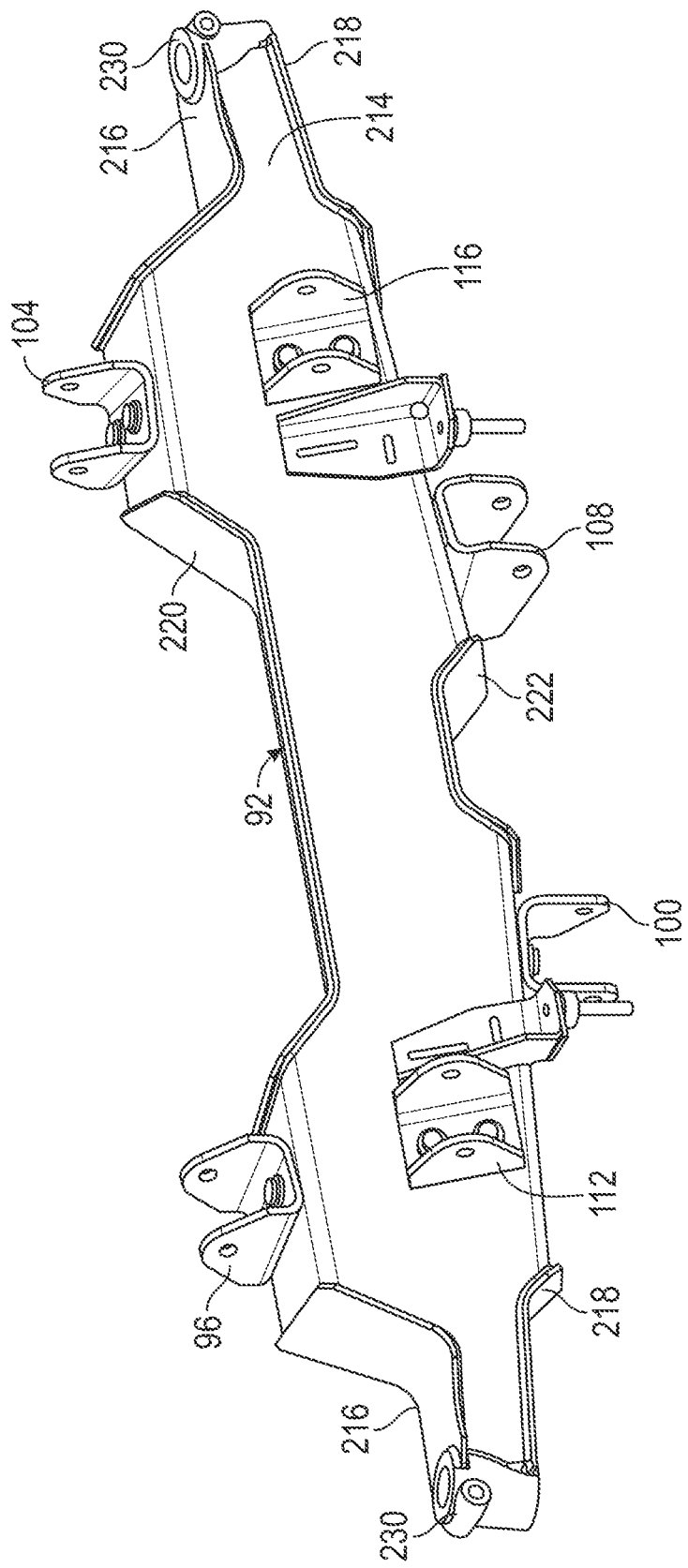
FIG. 3 is a top, front, right perspective view of an axle beam according to an exemplary embodiment.
Figure 4:
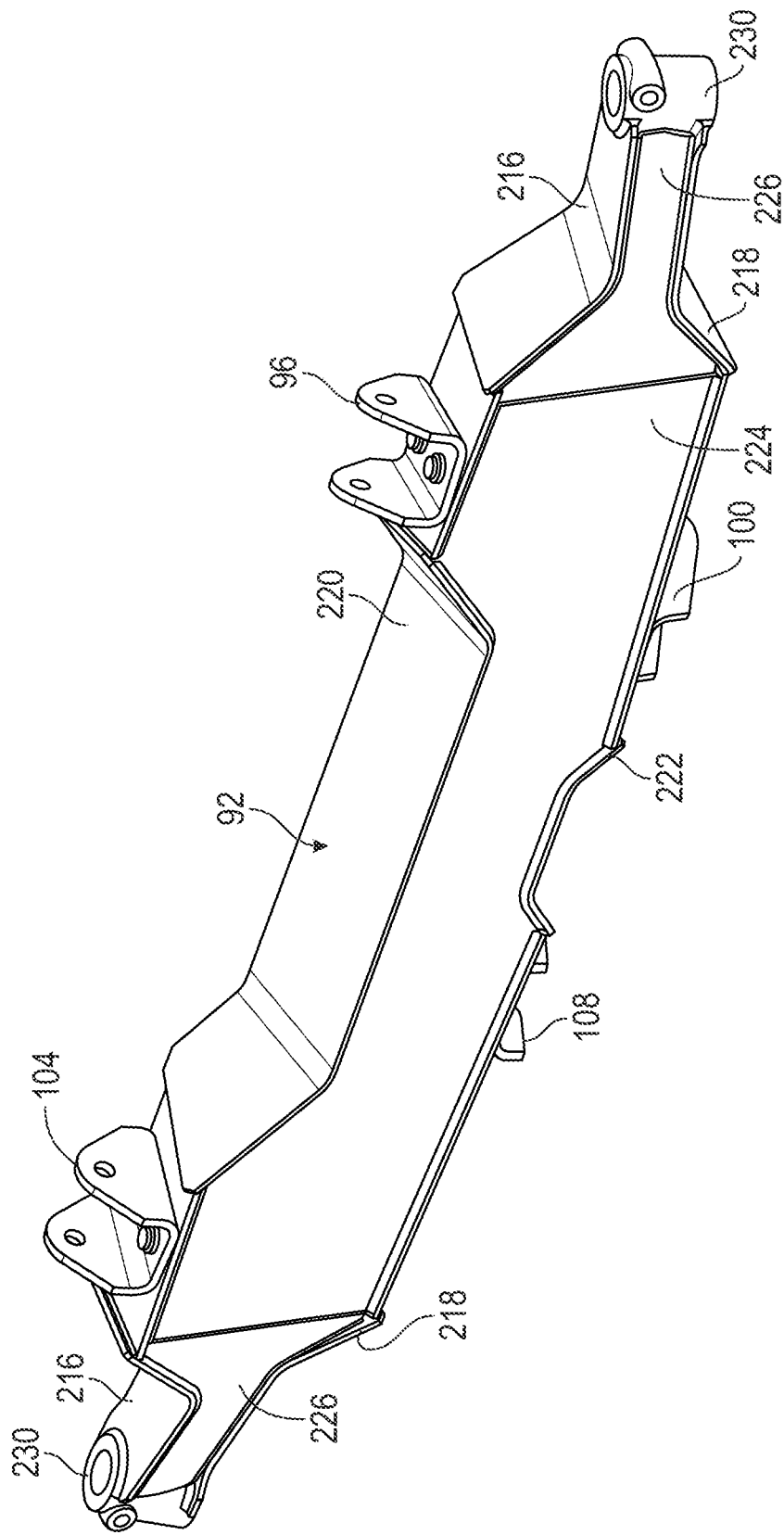
FIG. 4 is a top, rear, right perspective view of the axle beam of FIG. 3.
Figure 5:
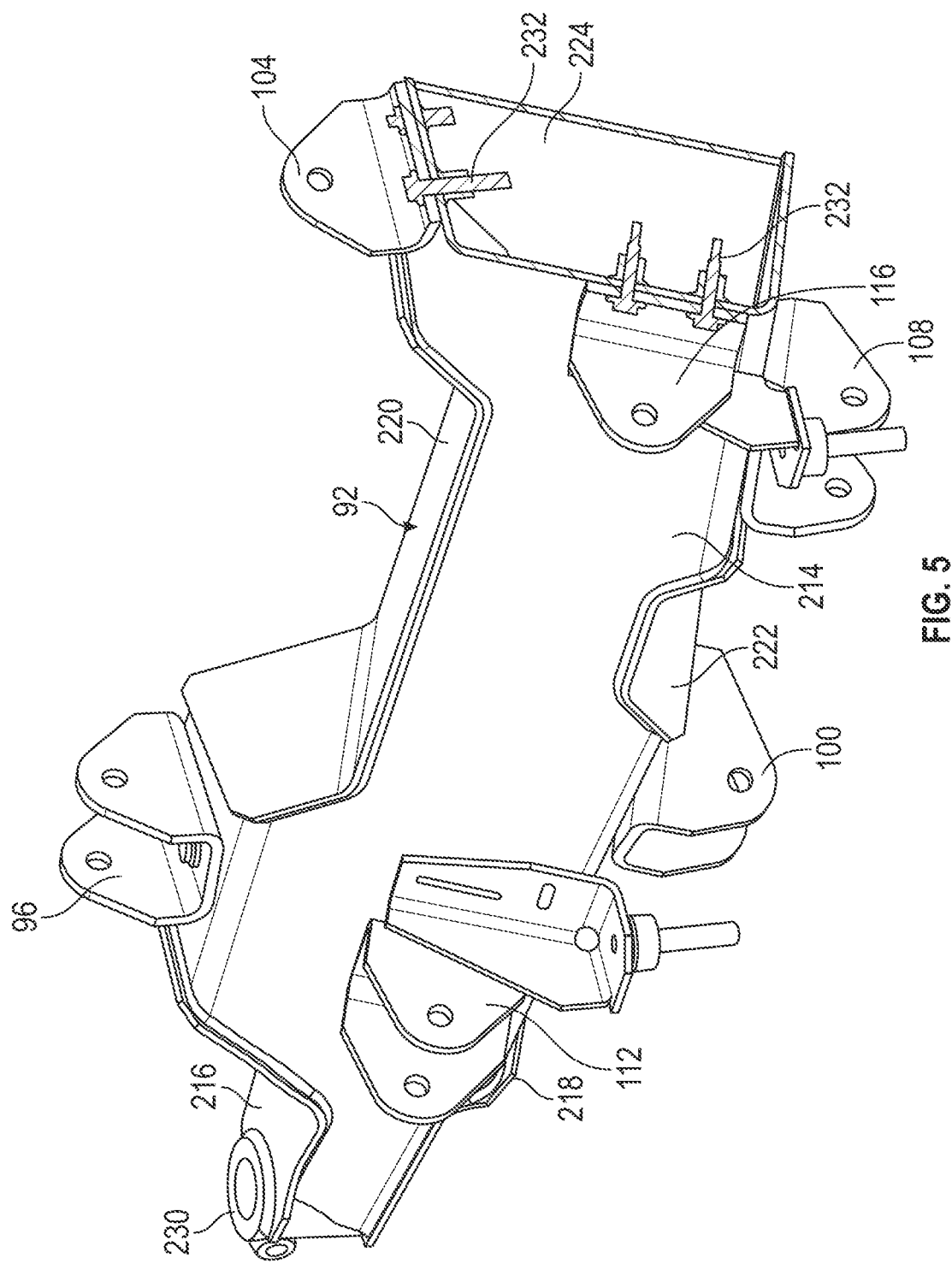
FIG. 5 is a section view of the axle beam of FIG. 3, showing a partial cross-section through the left brackets.

In one exemplary embodiment, and as shown in FIGS. 1 and 2, a vehicle chassis 20 of a vehicle is structured to support the vehicle for travel. In some embodiments, the vehicle is a concrete truck including wheel assemblies, a cab, and a concrete mixing cylinder supported on or coupled to the vehicle chassis 20. In some embodiments, the portion of the vehicle chassis 20 shown in FIGS. 1 and 2 is a rearward portion of the vehicle chassis 20. In some embodiments, the vehicle chassis 20 is shaped differently but still provides a rigid structure.

Figure 10:
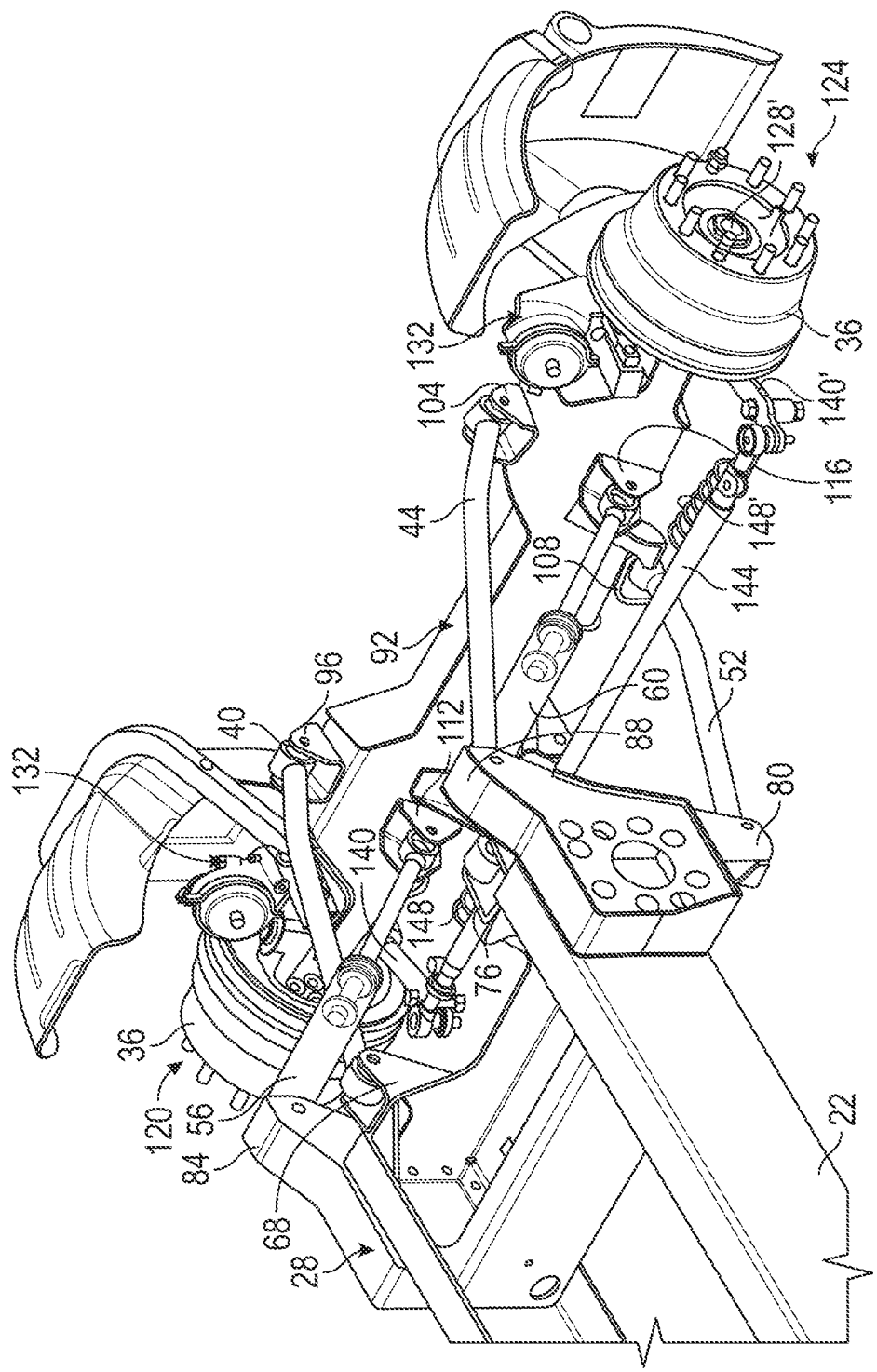
FIG. 10 is a top, front, left perspective view of the LSTA system of FIG. 1 in a lowered position.
Figure 11:
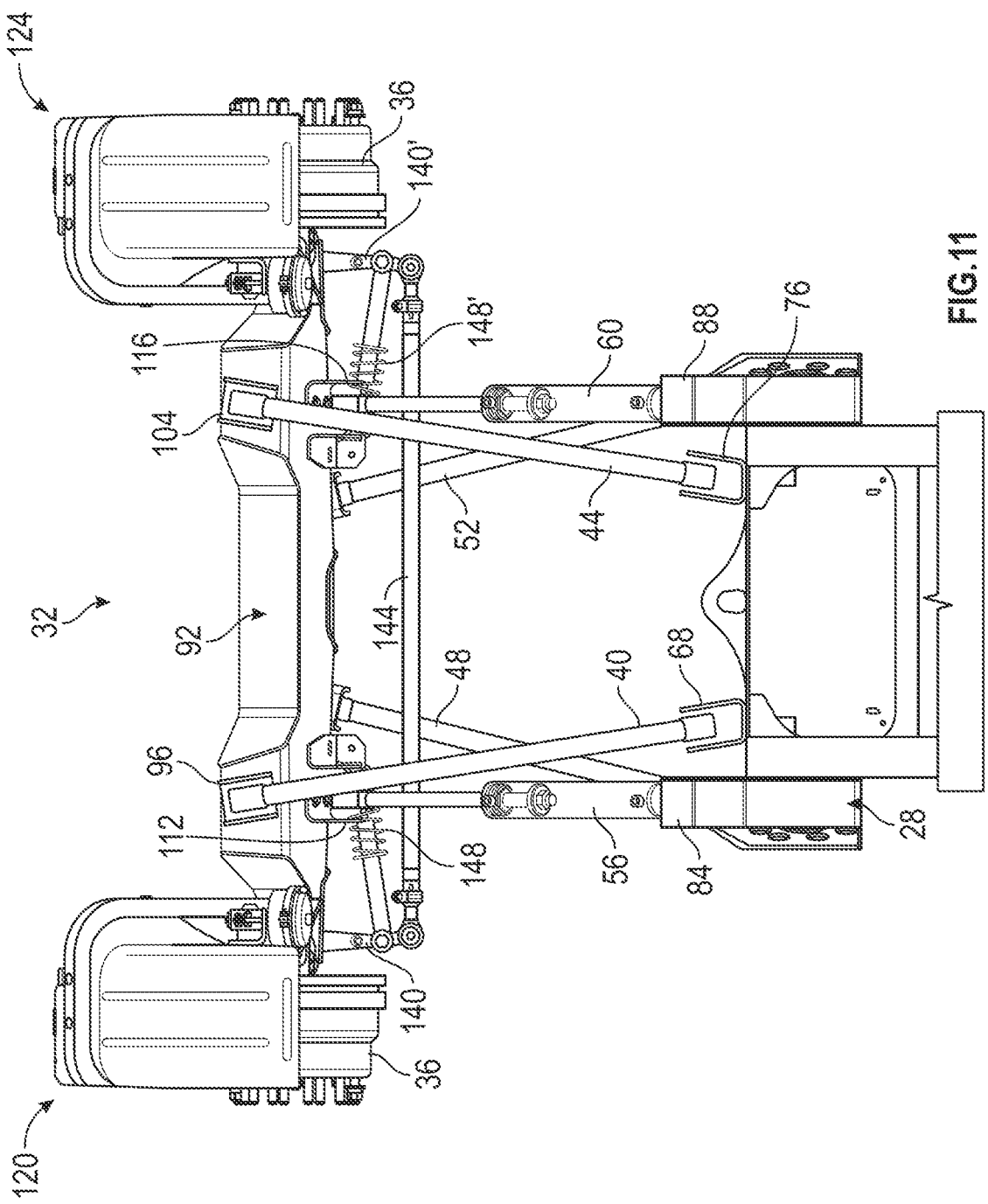
FIG. 11 is a top view of the LSTA system of FIG. 1 in the lowered position.

A load span tag axle (LSTA) system 24 is coupled to the vehicle chassis 20 and includes a chassis mount 28 that is rigidly attached to the vehicle chassis 20, and an axle assembly 32 that supports two hubs 36 (each hub 36 configured to support a wheel) and is connected to the chassis mount 28 by a four-bar swing linkage that includes a right upper link 40, a left upper link 44, a right lower link 48, and a left lower link 52. A right hydraulic cylinder 56 and a left hydraulic cylinder 60 are connected between the chassis mount 28 and the axle assembly 32 and, in one mode of operation, actuate the axle assembly 32 between a raised position (shown in FIG. 1) and a lowered position (shown in FIG. 10). A hydraulic system 64 controls operation of the right hydraulic cylinder 56 and the left hydraulic cylinder 60. In other embodiments, the LSTA system 24 includes another type of actuator in addition to or in place of the right hydraulic cylinder 56 and the left hydraulic cylinder 60 (e.g., a rotary hydraulic actuator, another type of rotary actuator, another type of linear actuator, etc.).

The chassis mount 28 is attached to the vehicle chassis 20 (e.g., with fasteners, etc.). In some embodiments, the chassis mount 28 is welded to the vehicle chassis 20 or formed as a part of the vehicle chassis 20. The chassis mount 28 includes a right upper mount bracket 68, a right lower mount bracket 72, a left upper mount bracket 76, and a left lower mount bracket 80. The right upper mount bracket 68 is structured to be connected to the right upper link 40, the right lower mount bracket 72 is structured to be connected to the right lower link 48, the left upper mount bracket 76 is structured to be connected to the left upper link 44, and the left lower mount bracket 80 is structured to be connected to the left lower link 52. In some embodiments, the links 40, 44, 48, 52 are connected to the mount brackets 68, 72, 76, 80 with captured bearings and fastener arrangements. In some embodiments, the links 40, 44, 48, 52 are permitted to move relative to the mount brackets 68, 72, 76, 80 with one degree of freedom (e.g., rotation) and are substantially constrained from moving in a side to side direction.

The chassis mount 28 further includes a right actuator mount bracket 84 that is structured to be connected to the right hydraulic cylinder 56 and a left actuator mount bracket 88 that is structured to be connected to the left hydraulic cylinder 60. Similar to the mount brackets 68, 72, 76, 80, the actuator mount brackets 84, 88 can be connected to the hydraulic cylinders 56, 60 with captured bearings and fasteners to permit rotation of the hydraulic cylinders 56, 60 relative to the chassis mount 28 while inhibiting other movement of the hydraulic cylinders 56, 60.

The axle assembly 32 includes an axle beam 92 that includes a right upper axle bracket 96 structured to be connected to the right upper link 40, a right lower axle bracket 100 structured to be connected to the right lower link 48, a left upper axle bracket 104 structured to be connected to the left upper link 44, and a left lower axle bracket 108 structured to be connected to the left lower link 52. Similar to the mount brackets 68, 72, 76, 80, the axle brackets 96, 100, 104, 108 can be connected to the links 40, 44, 48, 52 with captured bearings and fasteners to permit rotation of the links 40, 44, 48, 52 relative to the axle beam 92 while inhibiting other movement of the links 40, 44, 48, 52. The axle beam 92 also includes a right actuator axle bracket 112 that is structured to be connected to the right hydraulic cylinder 56, and a left actuator axle bracket 116 that is structured to be connected to the left hydraulic cylinder 60. The actuator axle brackets 112, 116 can be connected to the hydraulic cylinders 56, 60 with captured bearings and fasteners to permit rotation of the hydraulic cylinders 56, 60 relative to the axle beam 92 while inhibiting other movement of the hydraulic cylinders 56, 60. In the embodiment of FIGS. 1-2, each of the links 40, 44, 48, 52 is secured to the axle beam 92 using a bolt (not shown) that extends through holes in the axle brackets 96, 100, 104, 108 and a bushing at one end of the link 40, 44, 48, 52.

According to the exemplary embodiment shown in FIGS. 3-6, the axle beam 92 is formed from ten metal plates, shown as forward plate 214 (FIG. 3), upper end plates 216, lower end plates 218, upper midplate 220, lower midplate 222, and rear plate 224, and end rear plates 226 that are welded together. In various alternative embodiments, the number and arrangement of plates may differ. Each of the plates 214, 216, 218, 220, 222, 224, 226 is made from a single piece of sheet metal (e.g., carbon steel) that is bent into the desired shape. As shown in FIGS. 3-6, each of the plates 214, 216, 218, 220, 222, 224, 226 includes no more than two bends, an apparatus configuration that simplifies manufacturing of the axle beam 92 and provides complete access to inner and outer surfaces of each plate 214, 216, 218, 220, 222, 224, 226 prior to welding.

Figure 6:
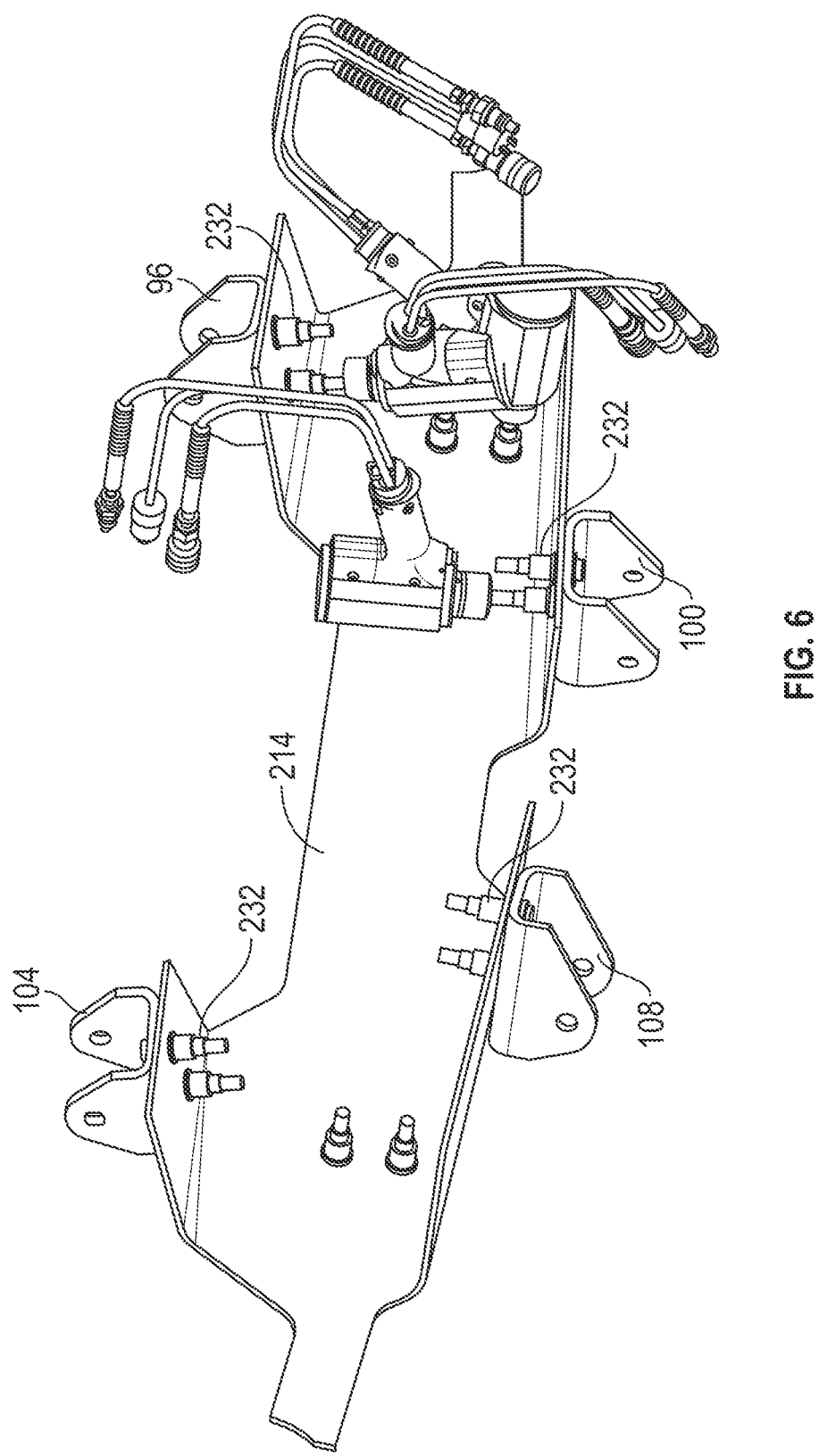
FIG. 6 is a bottom, rear, right perspective view of the axle beam of FIG. 3 with part of the axle beam removed.

As shown in FIG. 6, each of the axle brackets 96, 100, 104, 108 is affixed to the forward plate 214 using a plurality of fasteners 232 (e.g., lockbolts such as Huck lockbolts, although any other suitable fastener may be used) that extend through a connection hole the axle bracket 96, 100, 104, 108 and a corresponding mounting hole in the forward plate 214. The two-bend plate assembly provides user access to an inside surface 228 of the forward plate 214, which is required in order to secure each one of the plurality of fasteners 232 into position. Among other benefits, using a plurality of fasteners 232 to secure the brackets to the forward plate 214 eliminates the risk of weld fatigue at critical attachment points. A coupling 230 (FIGS. 3-5) for the kingpin 136 (see also FIGS. 1-2) is disposed at both ends of the axle beam 92. Each coupling 230 is welded to at least one of the forward plate 214, upper end plate 216, lower end plate 218, and end rear plate 226.

The axle assembly 32 also includes a right wheel assembly 120 and a left wheel assembly 124. The left wheel assembly 124 is substantially similar to the right wheel assembly 120, with like numerals identifying like components (i.e. components for the left wheel assembly 124 that are similar to the right wheel assembly 120 are denoted using like numbers in prime series). The right wheel assembly 120 is mounted to the axle beam 92 and includes a spindle/knuckle 128, a brake assembly 132, a kingpin 136 coupled between the spindle/knuckle 128 and the axle beam 92 at a kingpin caster angle to allow rotation of the wheel assembly 120 relative to the axle beam 92 thereabout, and a steering arm 140 extending from the spindle/knuckle 128 toward the vehicle chassis 20. The hub 36 is attached to the spindle/knuckle 128 and is free to rotate thereabout. The brake assembly 132 is structured to slow the rotation of the hub 36 via frictional engagement. In some embodiments, the brake assembly 132 is a drum brake assembly, a disk brake assembly, a manually operated brake system, and electronically operated brake system, a hydraulic brake system, or another brake system, as desired.

The axle assembly 32 further includes a steering assembly having a connecting rod 144 connected between the steering arms 140, 140', and a centering system having a right spring damper 148 connected between the axle beam 92 and the right steering arm 140 and a left spring damper 148' connected between the axle beam 92 and the left steering arm 140'. The connecting rod 144 ties the right wheel assembly 120 to the left wheel assembly 124 so that rotation of the wheel assemblies 120, 124 is coordinated. In other words, the right wheel assembly 120 is inhibited from rotating relative to the left wheel assembly 124. The right spring damper 148 and the left spring damper 148' act to bias the wheel assemblies 120, 124 toward a center position (e.g., a position that drives straight). The connecting rod 144 is arranged vertically between the upper links 40, 44 and the lower links 48, 52 and in front of the axle beam 92. Additionally, the caster angle of the wheel assemblies 120, 124 can be changed to move the steering axis in forward or backward, as desired.

Returning to FIG. 2, the four-bar swing linkage that couples the chassis mount 28 to the axle assembly 32 includes the right upper link 40, the left upper link 44, the right lower link 48, and the left lower link 52. The vehicle chassis 20 defines a central axis A extending longitudinally (e.g., front to back). The upper links 40, 44 are angled laterally outward (e.g., away from the central axis A) as they extend toward the axle beam 92. As shown in FIG. 2, each of the upper links 40, 44 define an upper link angle B relative to the central axis A. The upper link angle of the right upper link 40 is mirrored relative to the upper link angle of the left upper link 44. In some embodiments, the upper link angle B is about nine degrees (9°). In some embodiments, the upper link angle B is between about five degrees (5°) and about fifteen degrees (15°). The lower links 48, 52 are angled laterally inward (e.g., toward the central axis A) as they extend toward the axle beam 92. As shown in FIG. 2, each of the lower links 48, 52 define a lower link angle C relative to the central axis A. The lower link angle of the right lower link 48 is mirrored relative to the lower link angle of the left lower link 52. In some embodiments, the lower link angle C is about nine degrees (9°). In some embodiments, the lower link angle C is between about five degrees (5°) and about fifteen degrees (15°). In some embodiments, the upper link angle B and the lower link angle C are different. Additionally, the upper link angle B and the lower link angle C are mirrored relative to each other so that there is one-hundred-sixty-two degrees (162°) between the upper link angle B and the lower link angle C). The upper link angle B and the lower link angle C provide support in case of side loading from wheel scrubbing or other forces acting in a side-to-side direction. In another embodiment, the four-bar swing linkage has links that are otherwise positioned. By way of example, the upper links 40, 44 may angle laterally inward and the lower links 48, 52 may angle laterally outward.

Figure 8:
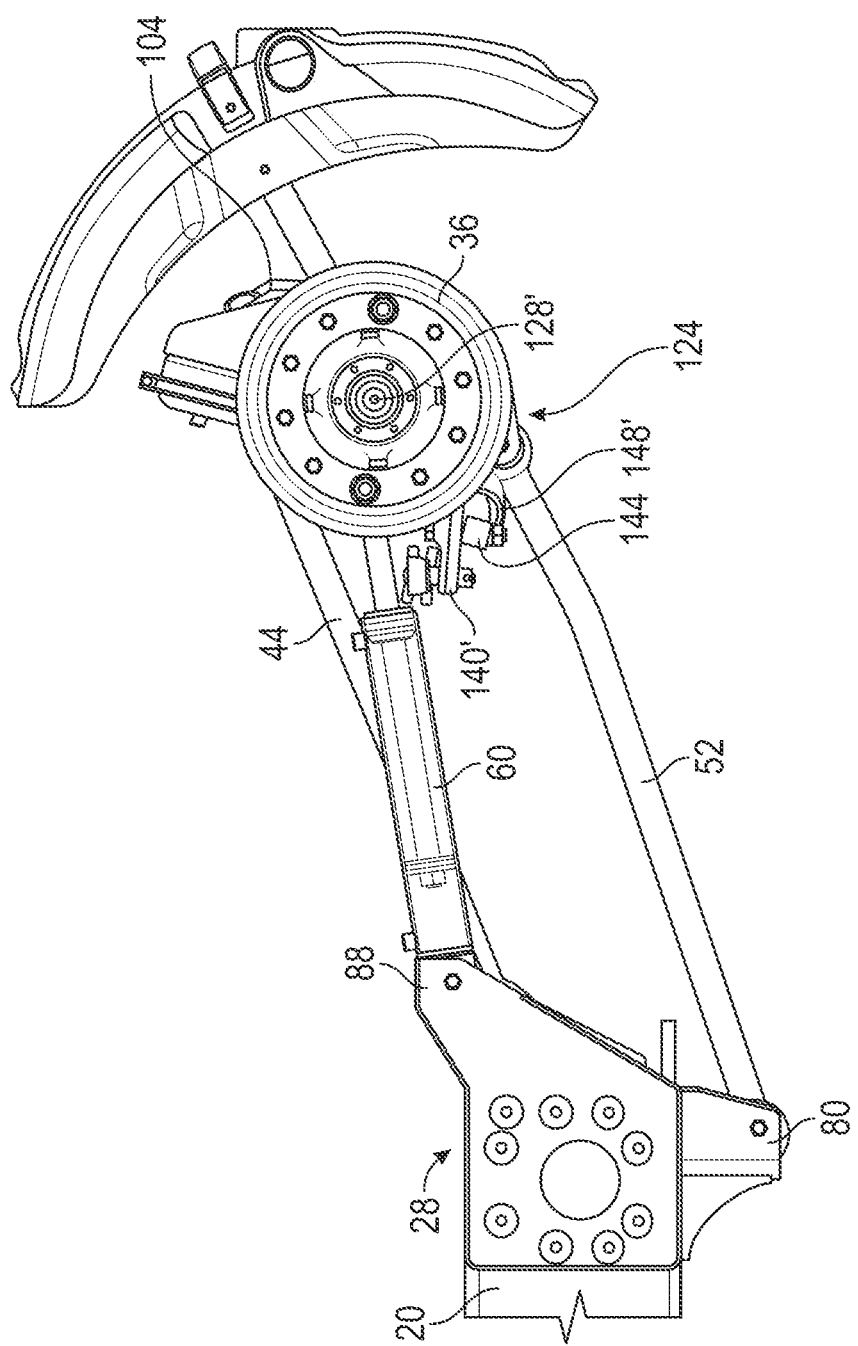
FIG. 8 is a left side view of the LSTA system of FIG. 1 in the raised position.
Figure 12:
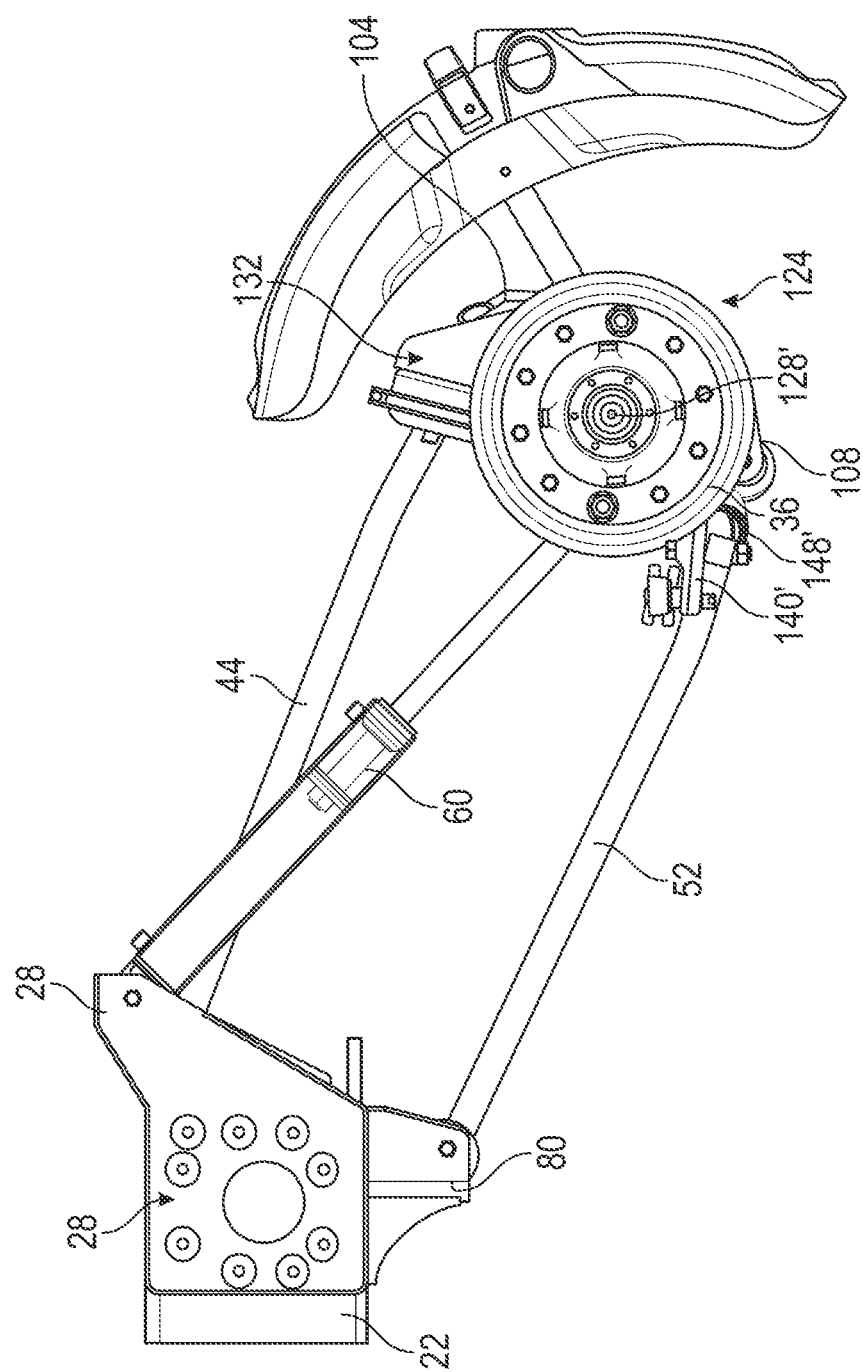
FIG. 12 is a left side view of the LSTA system of FIG. 1 in the lowered position.
Figure 13:
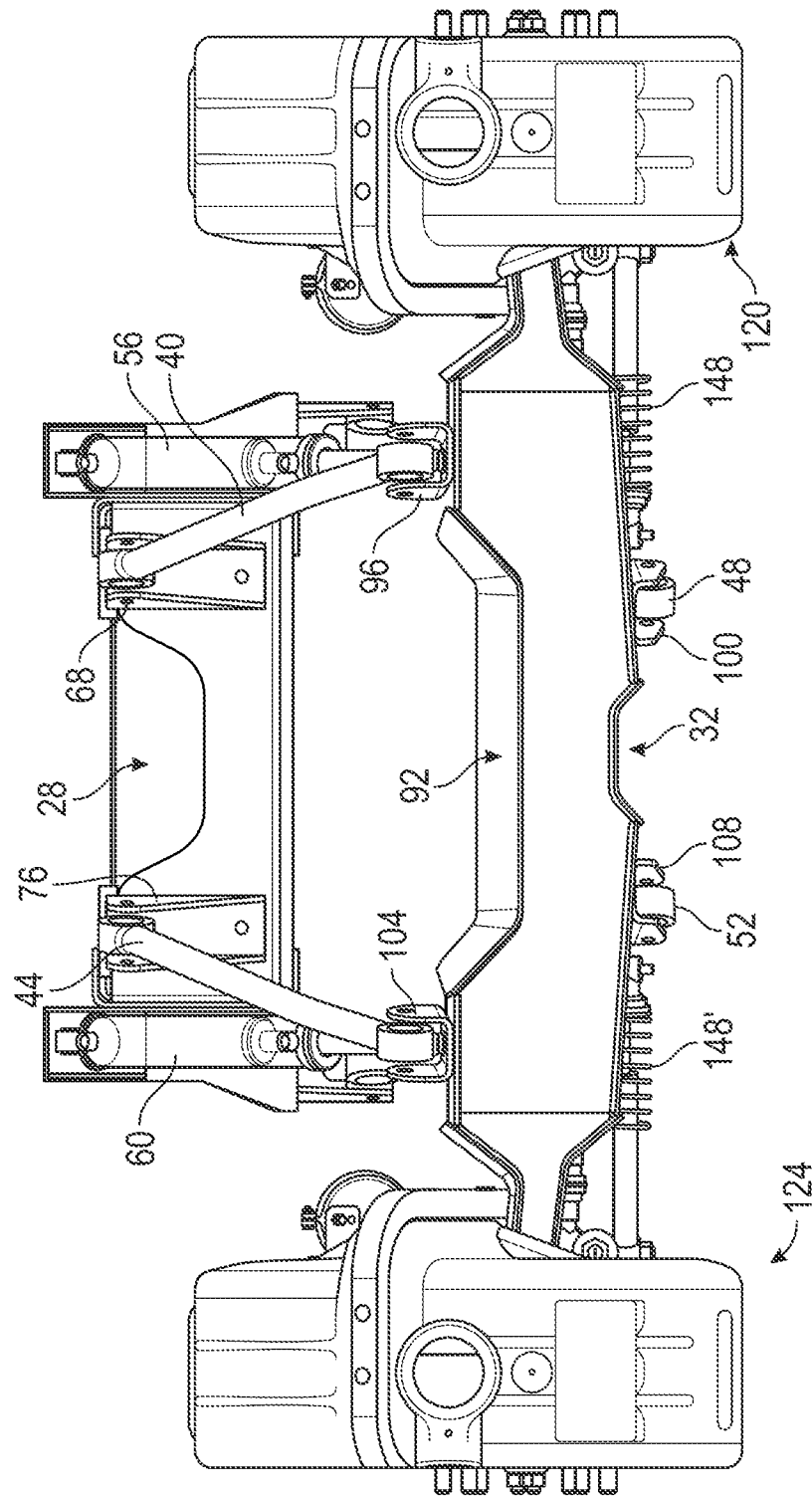
FIG. 13 is a rear view of the LSTA system of FIG. 1 in the lowered position.

As shown in FIGS. 8 and 12, each of the right upper link 40, the left upper link 44, the right lower link 48, and the left lower link 52 include a bend 230 between a midpoint of the links 40, 44, 48, 52 and the axle beam 92 (the bend 230 proximate to the end of each link that is connected to the axle beam 92). The bend 230 in each link 40, 44, 48, 52 increases the space contained between the upper links 40, 44 and the lower links 48, 52 as compared to a design configuration that uses links having a straight shaft.

The four-bar swing linkage including the right upper link 40, the left upper link 44, the right lower link 48, and the left lower link 52 is arranged as a parallelogram linkage (i.e., a parallelogram arrangement) and is arranged to maintain the kingpin caster angle regardless of loading in the lowered position. The kingpin caster angle affects wheel chatter and wear characteristics. Controlling the kingpin caster angle throughout use in the lowered position provides an improvement over prior tag axles where the kingpin caster angle can change or become too low in some loading conditions. Some prior tag axles used shims in an attempt to control the kingpin caster angle, but were unable to address all loading conditions. The parallelogram linkage substantially eliminates the use of shims and addresses more loading conditions.

In some embodiments, the four-bar linkage is not arranged as a parallelogram linkage. A non-parallelogram arrangement may result in small changes to the kingpin caster angle but the variance of the kingpin caster angle may be maintained within an acceptable range when in the lowered position. While the kingpin caster angle may be variable, the non-parallelogram linkage may provide additional space between the links as they actuate between the raised position and the lowered position. Additionally, the non-parallelogram linkage may provide a greater axle lift height. The additional space is created by the axle rotating forward (more upright) as it lifts which increases the vertical spacing between the attachment points on the axle.

Figure 7:
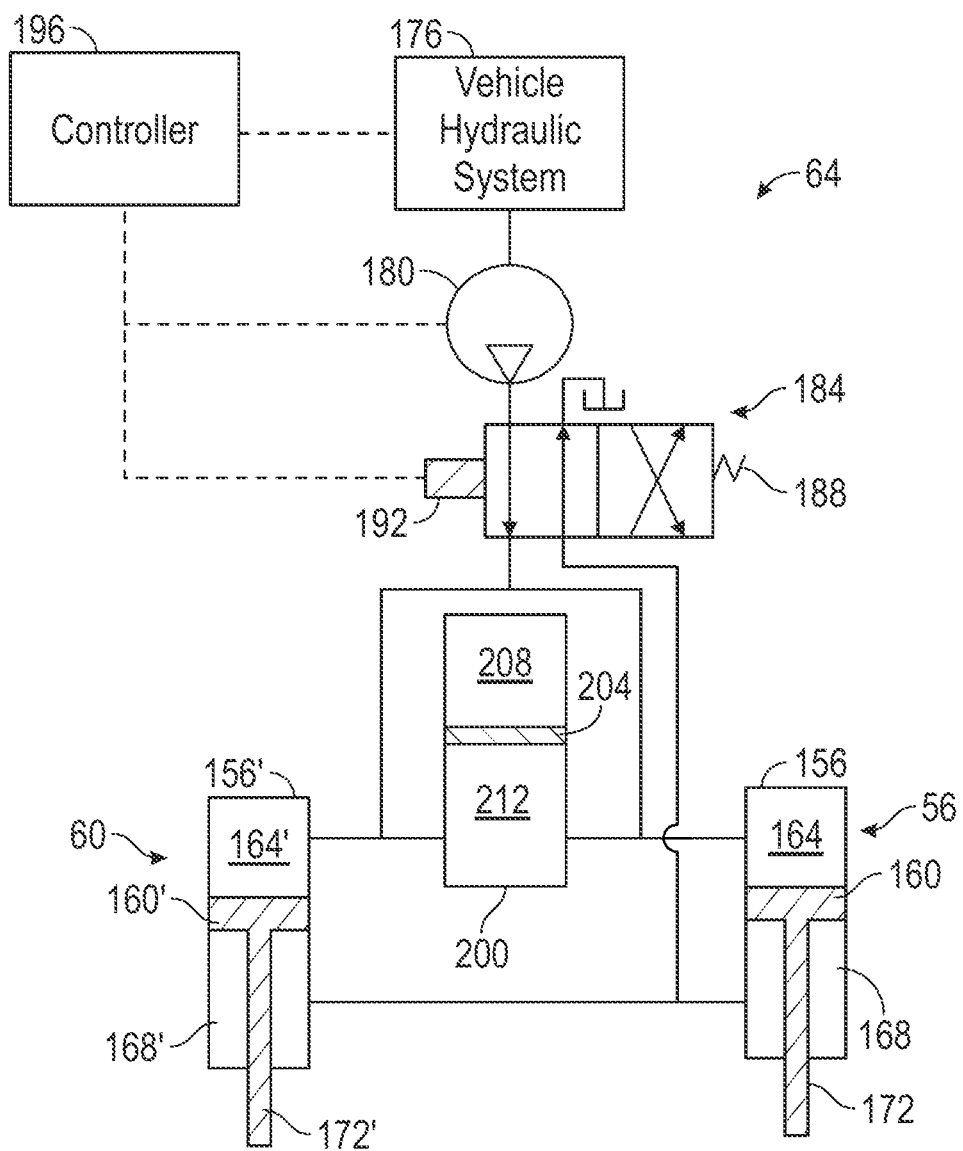
FIG. 7 is a schematic diagram of a hydraulic system of the LSTA system of FIG. 1.

As shown in FIG. 7, the right hydraulic cylinder 56 includes a cylinder 156 structured to couple with the right actuator mount bracket 84, a plunger 160 dividing the cylinder into a first chamber 164 and a second chamber 168 that is isolated from the first chamber 164, and a rod 172 extending from the plunger 160 and structured to couple with the right actuator axle bracket 112. The left hydraulic cylinder 60 is substantially similar to the right hydraulic cylinder 56 and includes a cylinder 156' structured to couple with the left actuator mount bracket 88, a plunger 160' dividing the cylinder into a first chamber 164' and a second chamber 168' that is isolated from the first chamber 164', and a rod 172' extending from the plunger 160' and structured to couple with the left actuator axle bracket 116. The right hydraulic cylinder 56 and the left hydraulic cylinder 60 are dual action hydraulic cylinders that can be actively driven between a retracted position corresponding to the raised position of the LSTA system 24 and an extended position corresponding to the lowered position of the LSTA system 24.

With continued reference to FIG. 7, the hydraulic system 64 includes a vehicle hydraulic system 176 that controls various systems and subsystem of the vehicle. In some embodiments, the vehicle hydraulic system 176 operates the concrete mixer, a vehicle suspension system, a vehicle transmission, and/or other vehicle systems. A pump 180 is arranged in communication with the vehicle hydraulic system 176 and operable to provide high pressure hydraulic fluid to a control valve 184. In some constructions, the control valve 184 is a two-position four-way spool valve that includes a return spring 188 and a solenoid 192. In some constructions, the control valve 184 may include a double acting inching circuit, or another control architecture, as desired. A controller 196 is arranged in communication with the vehicle hydraulic system 176, the pump 180, and the control valve 184 to control operation of the LSTA system 24 between the raised position (e.g., a lift mode) and the lowered position (e.g., a suspension/operational mode).

The hydraulic system 64 also includes an accumulator 200. In one embodiment, the accumulator 200 includes a movable element, shown as a piston 204. The movable element (e.g., the piston 204, a diaphragm, etc.) separates a spring chamber 208 from a collecting chamber 212 that is in fluid communication with the first chamber 164 of the right hydraulic cylinder 56 and the first chamber 164' of the left hydraulic cylinder 60. In some embodiments, the spring chamber 208 is charged with nitrogen or another gas to a predetermined pressure calibrated to a desired spring rate. In some embodiments, the spring chamber 208 is in communication with a pressure source (e.g., a pneumatic compressor) and maintained at the predetermined pressure. The piston 204 with moveable within the accumulator 200 to compress the gas in the spring chamber 208 thereby prompting a spring force in opposition to the movement. In other words, the predetermined pressure in the spring chamber 208 exerts a bias or a spring force against the piston 204 toward the collecting chamber 212.

With continued reference to FIG. 7, when the controller 196 controls actuation to the lowered position (as shown), the control valve 184 is moved to a first position and the pump provides high pressure hydraulic fluid to the first chambers 164, 164' of the hydraulic cylinders 56, 60 and the collecting chamber 212 of the accumulator 200. The high pressure hydraulic fluid exerts force on the plungers 160, 160' and the rods 172, 172' are moved to the extended position so that the LSTA system 24 is arranged in the lowered position (i.e., the suspension/operational mode). As the vehicle moves over uneven terrain, forces and movement may be imparted to the LSTA system 24. The right hydraulic cylinder 56 and the left hydraulic cylinder 60 are structured as suspension elements. As a suspension force acts on the rods 172, 172' hydraulic fluid is pushed from the first chambers 164, 164' into the collection chamber 212 of the accumulator 200 against the spring force of the spring chamber 208. As the piston 204 moves within the accumulator 200, the spring force increases and the piston 204 is forced toward the collecting chamber 212 and the rods 172, 172' are again extended. In this way, a spring/damper (i.e., spring damper) suspension system is provided by the same cylinders (e.g., the right hydraulic cylinder 56 and the left hydraulic cylinder 60) that are used for actuation between modes. The accumulator 200 increases the reaction speed of the hydraulic system 64 when it is acting as a suspension system. The controller 196 controls the pump 180 to maintain a constant pressure within the cylinders 56, 60 so that a desired ground force is maintained.

When the controller 196 controls actuation to the raised position, the control valve 184 is moved to a second position so that high pressure hydraulic fluid is provided from the pump 180 to the second chambers 168, 168' of the hydraulic cylinders 56, 60 thereby retracting the rods 172, 172'. In some embodiments, the return spring 188 biases the control valve to the second position so that the second position is the rest position. In some embodiments, the return spring 188 is arranged to bias the control valve 184 toward the first position. In some embodiments, the control of the control valve 184 is arranged differently. For example, the control valve 184 may utilize pilots, more solenoids, manual controls, or other control architectures.

Figure 9:
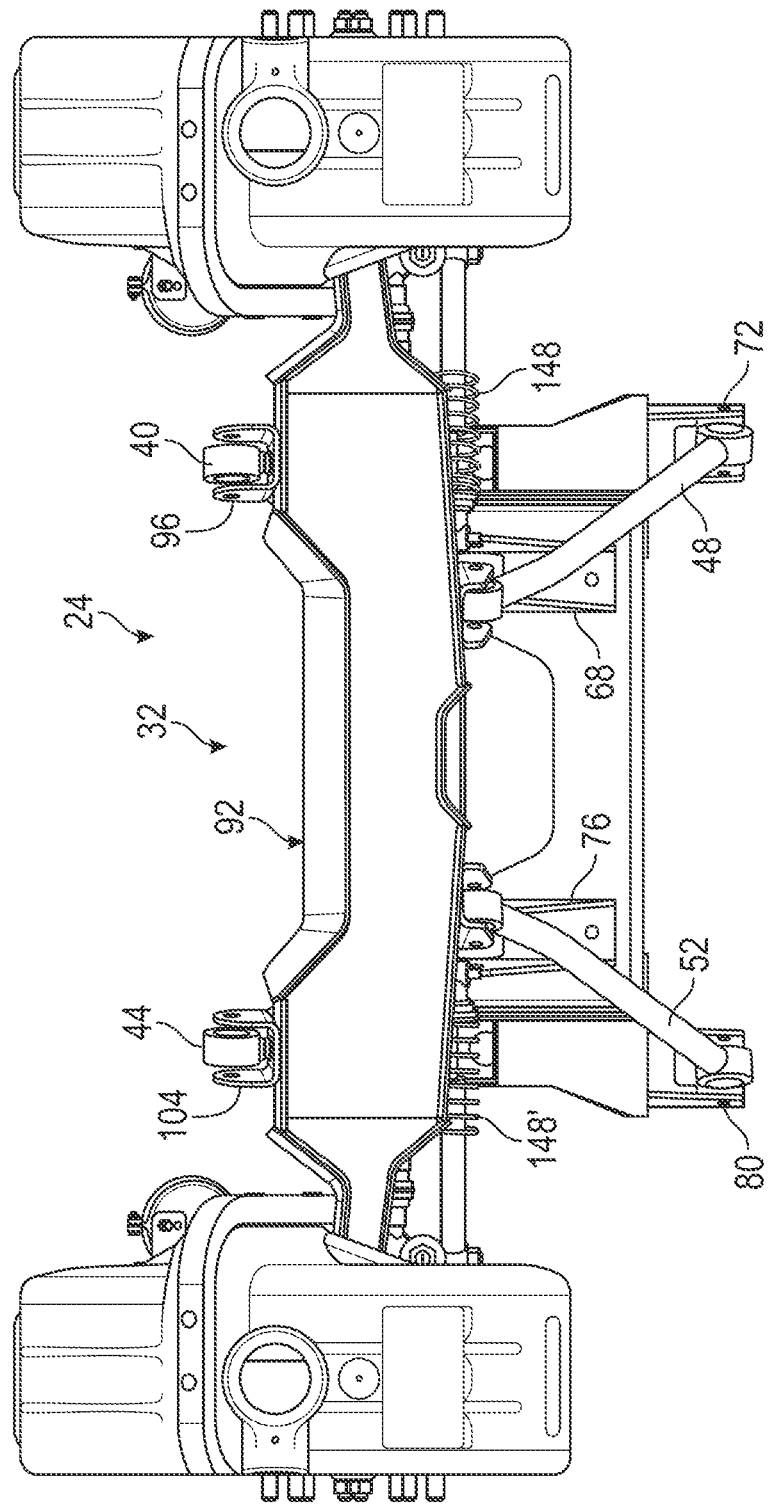
FIG. 9 is a rear view of the LSTA system of FIG. 1 in the raised position.

As shown in FIG. 8, when in the raised position, the spindles/knuckles 128, 128' are raised above the vehicle chassis 20. In the lowered position, as shown in FIG. 12, the spindles/knuckles 128, 128' are lowered below the vehicle chassis 20. FIG. 9 shows a rear view of the LSTA system 24, while FIGS. 10-13 show views corresponding to FIGS. 1-2 and 8-9, respectively, but with the LSTA system 24 configured in the lowered position. The LSTA system discussed above provides an advantageous auxiliary suspension for heavy vehicles that provides a required ground clearance, and a fast-acting suspension system that utilizing hydraulic cylinders acting as both actuators and suspension components. The parallelogram linkage provides side-to-side rigidity and a consistent kingpin caster angle during use. The steering or tracking system includes a centering feature and a connecting rod that is arranged in front of an axle frame and between linkage members to provide a compact and protected architecture.

Although this description may discuss a specific order of method steps, the order of the steps may differ from what is outlined. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the load span tag axle as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A tag axle system comprising:
   an axle assembly;
   a linkage coupling the axle assembly to a vehicle chassis and including a right upper link, a right lower link, a left upper link, and a left lower link,
     wherein the right upper link and the left upper link are arranged at an upper link angle relative to a central axis of the vehicle chassis, and the right lower link and the left lower link are arranged at a lower link angle relative to the central axis,
     wherein the upper link angle is between about five degrees and about fifteen degrees, and
     wherein the lower link angle is between about five degrees and about fifteen degrees; and
   a hydraulic cylinder coupled between the vehicle chassis and the axle assembly, the hydraulic cylinder actuating the axle assembly between a raised position and a lowered position, and acting as a spring damper suspension component.

2. The tag axle system of claim 1, wherein the axle assembly includes a steering system, and wherein the steering system includes a connecting rod coupled between a right wheel assembly and a left wheel assembly supported on the axle assembly.

3. The tag axle system of claim 2, wherein the connecting rod is positioned in front of an axle frame.

4. The tag axle system of claim 1, wherein the axle assembly includes a steering system including a centering system that includes a spring damper.

5. The tag axle system of claim 1, wherein the axle assembly includes a kingpin arranged at a kingpin caster angle, and wherein the kingpin caster angle is maintained in all loading conditions when the axle assembly is in the lowered position.

6. The tag axle system of claim 1, wherein the upper link angle and the lower link angle are substantially the same.

7. The tag axle system of claim 1, wherein the upper link angle and the lower link angle are mirrored.

8. The tag axle system of claim 1, wherein there is about one-hundred-sixty-two degrees between the upper link angle and the lower link angle.

9. The tag axle system of claim 1, wherein the linkage defines a parallelogram arrangement.

10. The tag axle system of claim 1, wherein the hydraulic cylinder is a first hydraulic cylinder, and the tag axle system further comprising a second hydraulic cylinder.

11. The tag axle system of claim 1, wherein the hydraulic cylinder is a dual acting hydraulic cylinder defining a first chamber and a second chamber, and
   the tag axle system further comprising a hydraulic system that includes an accumulator including a piston separating a pressurized spring chamber and a collecting chamber in communication with the first chamber of the hydraulic cylinder.

12. The tag axle system of claim 11, wherein the hydraulic system further includes a control valve moveable between a first position actuating the hydraulic cylinder to move the axle assembly to the raised position, and a second position actuating the hydraulic cylinder to move the axle assembly to the lowered position.

13. The tag axle system of claim 1, the axle assembly further comprising an axle beam, the axle beam further including:
   a plurality of plates welded together,
   a plurality of axle brackets, and
   a plurality of fasteners,
   wherein each one of the plurality of axle brackets is coupled to one of the plurality of plates using at least one of the plurality of fasteners.

14. The tag axle system of claim 13, wherein each one of the plurality of plates includes no more than two bends.

15. The tag axle system of claim 1,
   wherein each of the right upper link, the right lower link, the left upper link, and the left lower link define a link bend between a midpoint of the respective link and the axle assembly.

16. A tag axle system comprising:
   an axle assembly;
   a linkage coupling the axle assembly to a vehicle chassis and including a right upper link, a right lower link, a left upper link, and a left lower link, wherein each of the right upper link, the right lower link, the left upper link, and the left lower link define a link bend between a midpoint of the respective link and the axle assembly; and
   a hydraulic cylinder coupled between the vehicle chassis and the axle assembly, the hydraulic cylinder actuating the axle assembly between a raised position and a lowered position, and acting as a spring damper suspension component.

* * * * *